Oct. 31, 1961     C. E. GERMANO     3,006,506
MEASURING AND DISPENSING SPOUT
Filed Oct. 27, 1959
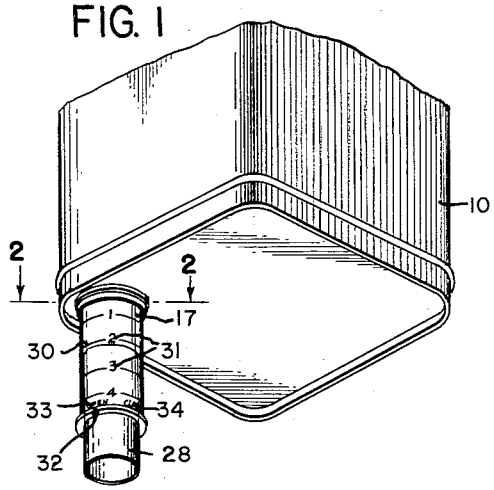
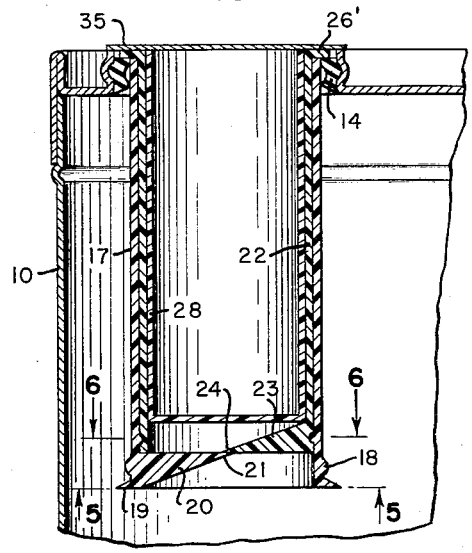
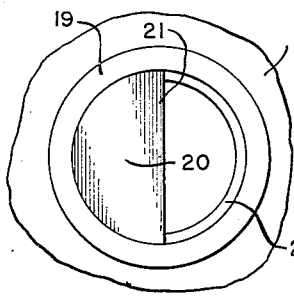
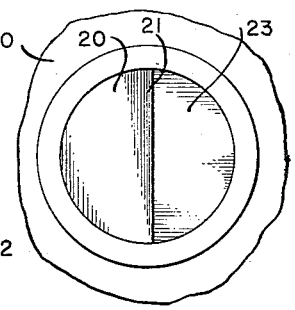
INVENTOR
C. E. GERMANO
BY *A. Yates Dowell.*
ATTORNEY 3,006,506
MEASURING AND DISPENSING SPOUT
Charles E. Germano, Poughkeepsie, N.Y.
(38 Materiel Squadron, APO 130, New York, N.Y.)
Filed Oct. 27, 1959, Ser. No. 849,078
2 Claims. (Cl. 222—49)

This invention relates to containers employed about the home and elsewhere for the holding and dispensing of commodities of various kinds and amounts and particularly to receptacles or containers for substances affected by the moisture in the air making it desirable to exclude the air therefrom.

The invention relates specifically to square or round containers manufactured in a manner to facilitate the dispensing of the contents in measured amounts and with closure means for retaining the contents in a substantially dry condition to avoid being affected by the moisture in the atmosphere.

Containers or receptacles for various products have had dispensing mechanisms in the form of pouring spouts or the like which could be operated to discharge a small amount of the contents of the container and then the discharge opening closed. With these devices it has been desirable to measure the amount of the contents dispensed and a simple, satisfactory, practical solution of this problem has not been available.

It is an object of the invention to provide a container having a measuring and dispensing portion and by means of which a desired amount of the contents of the container can be discharged or dispensed and the opening closed to protect the remainder of the contents from the moisture in the atmosphere.

Another object of the invention is to provide a container of any desired material and with a simple and inexpensive pouring or dispensing spout which can be held in an inoperative retracted position within the container and readily moved outwardly to a dispensing position and with such device of clear tubular plastic movable to a position to dispense a selected amount of the contents of the container and with means to indicate the quantity dispensed, and which spout can be readily closed to prevent contact between the remaining contents of the container and the atmosphere.

A further object of the invention is to provide a measuring and dispensing spout composed of individual clear plastic tubes movable from a retracted position within the container to a dispensing position with one of the tubes turnable relative to the other to open and close the discharge opening and with a removable dispensing portion by which a measured amount may be transported to the remote receptacle.

Other objects and advantages of the invention will be apparent from the following description taken in conjunction with the drawing, wherein:

FIG. 1 is a bottom perspective of an inverted coffee container having the invention applied thereto;

FIG. 2, a section on the line 2—2 of FIG. 1;

FIG. 3 a vertical section illustrating the dispensing mechanism in retracted inoperative position within the container;

FIG. 4, an interior plan view of the container with the dispensing mechanism in operative or extended position and viewed on the line 4—4 of FIG. 2;

FIG. 5, an end view of the dispensing mechanism retracted and viewed on the line 5—5 of FIG. 3; and FIG. 6, a transverse section of the dispensing mechanism on the line 6—6 of FIG. 3.

Briefly stated, the invention is a measuring and dispensing spout for a container of any desired character adapted to contain coffee or other granular substance. The dispensing spout comprises a pair of sleeves with semi-circular end portions adapted to be disposed in opposition to form a closure in one position and movable relative to each other for providing an opening and with an adjustable plug or closure the end of which is adjustable within the inner rotatable sleeve for determining the amount of material received within such sleeve after which the sleeve is rotated so that the semi-circular end portions are in opposed closed position and the plug removed to allow the material within the spout to be discharged.

With continued reference to the drawing a container 10 for coffee or other substance is provided with an opening 11 surrounded by an annular integral ring 12 with a central groove or recess 13 extending around the same. Within the ring there is an attaching collar 14 of flexible material having an external rib 15 received within the groove 13 and such collar also having along its inner surface an annular recess or groove 16. The collar 14 serves to receive and hold a sleeve 17 by means of an annular rib 18 fitting within the groove 16, such sleeve having an enlarged end flange 19 which fits snugly within the opening 11 when the parts are in the dispensing position of FIGS. 1 and 2, in which the can is inverted but prior to which the sleeves are retained within the container as illustrated in FIG. 3. The sleeve 17 is provided with an integral closure portion 20 in the form of a half circle with a thin edge 21 diametrically disposed slightly beyond the true diameter of the cylinder so that the remaining portion of the cylinder is open. In order to provide a closure for the open portion of the cylinder a second sleeve 22 is provided having a similar half-circular portion 23 which tapers to a thin edge 24 adapted to overlie the thin edge 21 providing a complete closure for the sleeves 17 and 22. In order to maintain the sleeves 17 and 22 in fixed axial relation the sleeve 17 is provided with a rib or projection 25 which is received within groove or recess 26 in the sleeve 22 when the upper end of the sleeve 22 is in abutting relation with the closure portion 20 of the sleeve 17. The sleeve 22 has an external flange 26' abutting the opposite end of the sleeve 17 and on account of its being slightly larger in diameter than the sleeve 17 it is employed to rotate the sleeve 22 relative to the sleeve 17 and cause the edge 24 of the half-circular portion 23 to rotate relative to the edge 21 of the half circular portion 20. This rotation gradually produces an opening 27 which increases in size and through which the contents of the container may flow by gravity until the sleeve 22 is rotated 180° at which time the portion 23 will be directly underneath the portion 20 and the opening 27 will be of maximum size. When the parts are in retracted position within the container as illustrated in FIG. 3 the flange 26' extends within the sleeve 12 and abuts the collar 14.

In order to adjustably control the quantity of material which flows from the container 10 into the sleeve 22, a cylindrical plug 28 is provided having a closed end 29 and such plug is of a size to slidably fit within the sleeve 22. The sleeves are preferably of clear plastic so that the contents may be observed and the outer sleeve 17 is provided with circular lines 30 and indicia 31 (FIG. 1) indicating by the position of sleeve 28 the capacity of the space within the sleeve 22 whereby all that is necessary is to have the parts providing the opening 27 and the sleeve 28 with its closed end 29 properly set and to invert the container so that material in the container 10 will flow by gravity and fill the space in the sleeve 22 after which the sleeve 22 can be rotated by the flange 26' to bring the substantially semi-circular portions 20 and 23 into opposition so that the opening from the container is closed. Also, the flange 26' is provided with an arrow or marker 32 and the sleeve 17 is provided with indicia 33 and 34 indicating whether the parts are in position so that the opening 27 will be open or closed.

After the coffee or other contents of the can has been allowed to flow through the opening 27 to fill the adjoining space within the sleeve 22 the parts are inverted so that the sleeves 22 and 17 extend upwardly from the container whereupon the plug 28 can be removed and the device inverted to cause the amount of material received and contained within the sleeve 22 to be emptied into the coffee maker or other structure.

It will be apparent from the foregoing that a simple and inexpensive measuring and dispensing mechanism is provided which can be located within a container until it is desired to dispense a portion of the contents of the container at which time the dispensing mechanism can be pulled from the container by the insertion of a thin blade beneath the flange 26 and the sleeves 17 and 22 extended to cause the rib 18 on the sleeve 17 to ride into the groove 16 on the attaching collar 14 and by means of the flange 26 the inner sleeve 22 rotated to open the opening 27 after the plug 28 has been adjusted so that the desired amount will be dispensed, after which the sleeve 22 will be rotated by manipulating the flange 26 to close the opening 27.

It will be obvious to those skilled in the art that various changes may be made in the invention without departing from the spirit and scope thereof and therefore the invention is not limited by that which is illustrated in the drawings and described in the specification, but only as indicated in the accompanying claims.

What is claimed is:

1. The combination of a container for material to be dispensed and telescopic measuring and dispensing apparatus housed entirely within said container, said container having an opening with an outwardly extending integral ring thereabout, a resilient collar within said ring, a first transparent sleeve slidably carried by said collar, means on the inner end of said first sleeve for engaging said collar when said sleeve is extended, a substantially semi-circular closure portion partially closing said inner end of said first sleeve, a second transparent sleeve rotatably mounted in said first sleeve, means preventing axial movement of said second sleeve, a substantially semi-circular closure portion partially closing the inner end of said second sleeve and located in proximity to the closure portion of said first sleeve, a manipulating flange on the outer end of said second sleeve whereby said second sleeve may be rotated to dispose the closure portion thereof in opposed relation to the closure portion of said first sleeve to prevent the passage of material therethrough or may be rotated to produce an opening of variable size to control the flow of material, a removable cylindrical plug slidable lengthwise within said second sleeve, said first transparent sleeve having indicia indicating the amount of material which can be introduced into said measuring and dispensing apparatus.

2. The combination of a container for material to be dispensed and telescopic measuring and dispensing apparatus housed entirely within said container, said container having an opening with an outwardly extending integral ring thereabout, a resilient collar within said ring, a first transparent sleeve slidably carried by said collar, means on the inner end of said first sleeve for engaging said collar when said sleeve is extended, a substantially semi-circular closure portion partially closing said inner end of said first sleeve, a second transparent sleeve rotatably mounted in said first sleeve, means preventing axial movement of said second sleeve, a substantially semi-circular closure portion partially closing the inner end of said second sleeve and located in proximity to the closure portion of said first sleeve, a manipulating flange on the outer end of said second sleeve whereby said second sleeve may be rotated to dispose the closure portion thereof in opposed relation to the closure portion of said first sleeve to prevent the passage of material therethrough or may be rotated to produce an opening of variable size to control the flow of material, and a removable cylindrical plug slidable lengthwise within said second sleeve.

References Cited in the file of this patent

UNITED STATES PATENTS

| 1,265,537 | Shull | May 7, 1918 |
| 1,959,276 | Paardecamp | May 15, 1934 |
| 2,569,325 | Muscal et al. | Sept. 25, 1951 |
| 2,774,523 | Rieke | Dec. 18, 1956 |